United States Patent [19]

Kuriyama

[11] Patent Number: 4,700,250
[45] Date of Patent: Oct. 13, 1987

[54] STRUCTURE FOR FIXING FLOATING TYPE MAGNETIC HEAD TO GIMBAL SPRING

[75] Inventor: Toshihiro Kuriyama, Nagaoka, Japan

[73] Assignee: Alps Electric Co., Ltd., Japan

[21] Appl. No.: 798,957

[22] Filed: Nov. 18, 1985

[30] Foreign Application Priority Data

Nov. 16, 1984 [JP] Japan ................. 59-174038

[51] Int. Cl.$^4$ ............. G11B 5/105; G11B 5/60; G11B 5/127; B32B 31/00
[52] U.S. Cl. ................. 360/104; 360/103; 29/603; 156/252; 156/290; 156/291
[58] Field of Search ........... 360/103, 104; 156/252, 156/290, 291; 29/603

[56] References Cited

U.S. PATENT DOCUMENTS 4,167,765 9/1979 Watrous ................. 360/103
4,588,458 5/1986 Previsani ................. 156/252

Primary Examiner—Robert S. Tupper
Attorney, Agent, or Firm—Guy W. Shoup

[57] ABSTRACT

Disclosed is a floating system magnetic head which comprises: a magnetic core having a gap formed therein and a coil wound thereon; a slider on which the magnetic core is fixed and which is supplied with a floating-up force by an air flow coming above a magnetic disk; a cantilever gimbal spring having a free end portion to which the slider is fixed through adhesive means and for applying a spring force to the slider against the floating-up force; and at least one hole formed in an adhesion portion of the gimbal spring to allow the adhesion means to come to the rear side of the adhesion portion through said hole to thereby increase the adhesion area between the gimbal spring and the slider.

1 Claim, 5 Drawing Figures

A-A' CROSS SECTION

A-A' CROSS SECTION

STRUCTURE FOR FIXING FLOATING TYPE MAGNETIC HEAD TO GIMBAL SPRING

BACKGROUND OF THE INVENTION

1. Field of the Invention

The present invention relates to a floating system magnetic head for use in a magnetic disk driving device or the like.

2. Description of Prior Art

FIGS. 3 to 5 show a conventional floating system magnetic head in which reference numeral 1 designates a magnetic core made of ferrite or the like, and having a gap formed in the surface opposite to to a magnetic disk, 2 a coil wound on the magnetic core 1, 3 a slider of ceramics or the like on which the magnetic core 1 is fixed by glass or the like, 3a a notch forming a step portion of the slider 3, 4 a cantilever gimbal spring for applying a predetermined spring force to the slider 3, and 5 a tube guiding the terminals of the coil 2 to an external mechanism. The foregoing gimbal spring 4 is provided with a flexure portion 4a adhered to the slider 3 through resin or the like at the notch 3a, a load beam portion 4b on which the rear portion of the flexure portion 4a is fixed by spot welding, a mount portion 4c on which the rear portion of the load beam portion 4b is fixed by spot welding.

FIGS. 4 and 5 are diagrams for explaining in detail the adhesion state between the slider 3 and the gimbal spring 4 shown in FIG. 3, and an enlarged perspective view showing the flexure portion 4a and the slider 3 of the gimbal spring 4 and a cross section of the flexure portion 4a, respectively. As apparent from these drawings, the flexure portion 4a of the gimbal spring 4 is positioned at a transversely substantial center portion of the notch 3a of the slider 3, and the lower surface of the notch 3a is adhered to the adhesion portion 4d of the flexure portion 4a through resin, so that the slider portion 3 is fixedly held at a free end portion of the gimbal spring 4.

In the thus arranged floating system magnetic head, an air flow caused by the high-speed rotation of a magnetic head comes below the slider 3 and is compressed thereat so as to cause the slider 3 to float up, the floating system magnetic head being stabilized at the position where the air pressure and the spring force are exactly balanced with each other. Generally, the amount of floating-up in this state is set to be about 0.4 m, and the spring force is set to be about 10 gw. In this state where the head itself is floating in the space in the foregoing manner, information is written into a magnetic disk or the information recorded in the magnetic disk is read out.

In the conventional floating system magnetic head, as described above, the slider 3 and the gimbal spring 4 are fixed to each other only through adhering resin, so that the adhesive is not enough therebetween and there has been such a risk that peeling off may occur. If a part of the slider 3 peels off from the gimbal spring 4, a desired amount of floating-up can not be obtained, a signal recorded on a magnetic disk may be destroyed in some cases, a storing layer may be destroyed in the worst case, etc., and therefore there has been such a risk that the products were extremely deteriorated in reliability.

SUMMARY OF THE INVENTION

It is therefore an object of the present invention to eliminate the foregoing disadvantage of the conventional floating system magnetic head.

Another object of the present invention is to provide an improved floating system magnetic head in which the adhesion area between a slider and a gimbal spring is increased to prevent peeling off from occurring therebetween.

To attain the objects, according to the present invention, a hole is formed in a flexure portion of the gimbal spring so that resin, an adhesive agent, or the like, comes onto the rear slide of an adhesion portion of the gimbal spring to thereby increase the adhesion area between the silder and gimbal spring.

DETAILED DESCRIPTION OF PREFERRED EMBODIMENT

Figure 1:
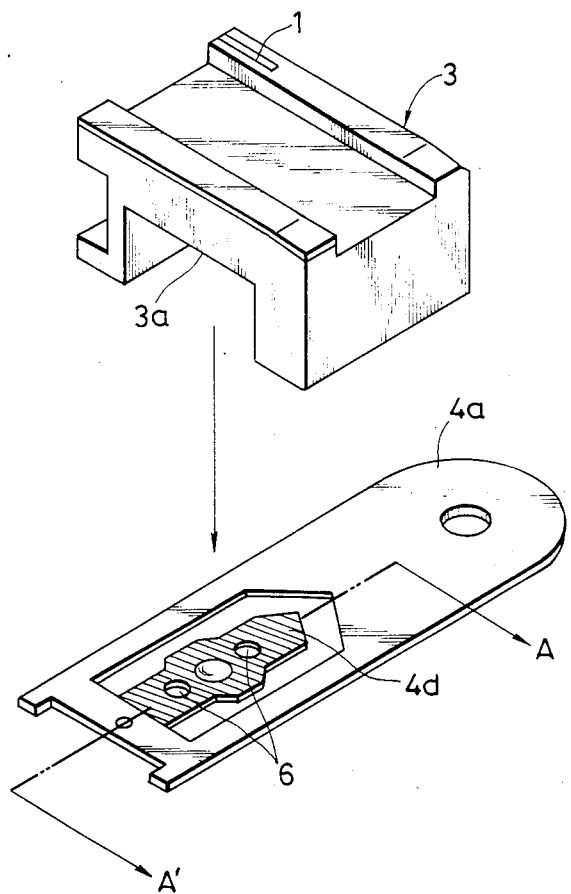
FIG. 1 is an exploded perspective view showing an embodiment of the floating system magnetic head according to the present invention.
Figure 2:
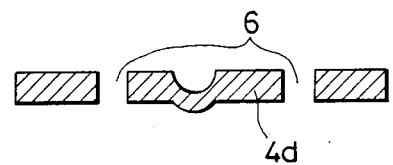
FIG. 2 is a cross section of the magnetic head of FIG. 1.
Figure 3:
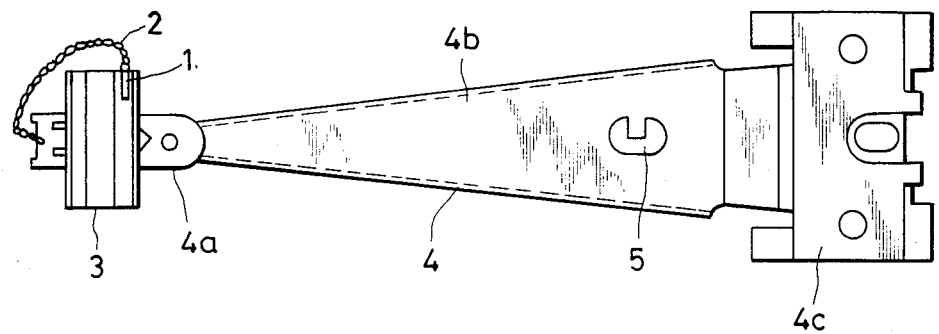
FIG. 3 is a top plan view showing a conventional floating system magnetic head.
Figure 4:
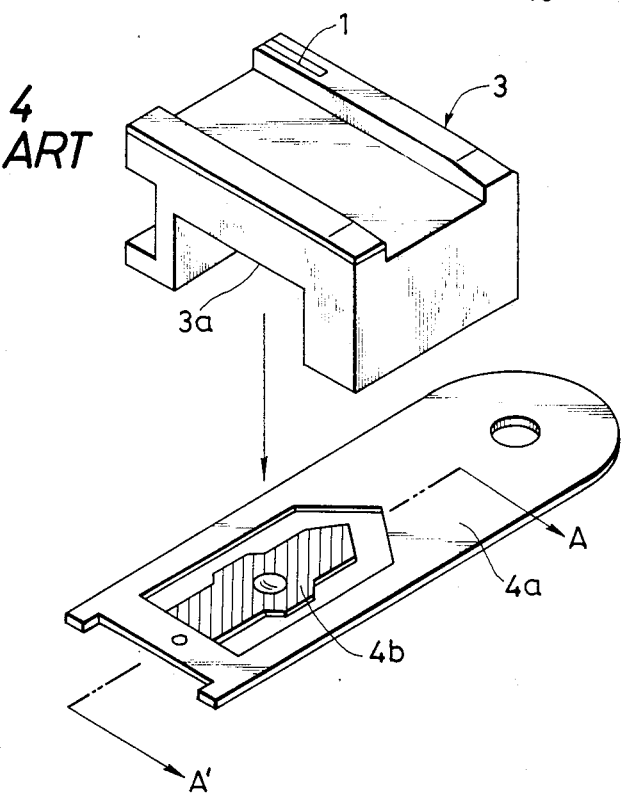
FIG. 4 is an exploded perspective view of the magnetic head of FIG. 3.
Figure 5:
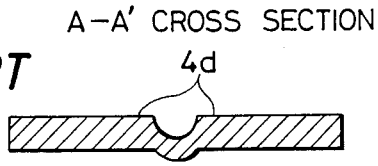
FIG. 5 is a cross section of the magnetic head of FIG. 3.

Referring to FIGS. 1 and 2 of the drawings, an embodiment according to the present invention will be described hereunder. In FIGS. 1 and 2, items corresponding to those in the conventional system shown in FIGS. 3 to 5 are correspondingly referenced and detailed description about them is omitted.

FIGS. 1 and 2 are respectively a perspective diagram and a cross section showing the embodiment according to the present invention. As shown in FIG. 2, one or more holes 6 are formed in an adhesion portion 4d of a flexure portion 4a so that resin, an adhesive agent, or the like, is allowed to come onto the rear side of an adhesion portion 4d through the holes 6, and a slider 3 is fixed to a notch portion 3a by applying resin or an adhesive agent onto the adhesion portion 4d of the flexure portion 4a.

According to the present invention, the holes 6 are provided in the adhesion portion 4d of a flexure portion 4a so that resin, an adhesive agent, or the like, comes onto the rear side of the adhesion portion 4d of the flexure portion 4a to thereby increase the adhesion area and the adhesion agent which has been provided through the holes 6 acts as if it is a pile inserted into each hole 6 to thereby increase the adhesive strength about two times as much as that of the conventional case. Thus, there is no risk that slider 3 would peel off from the gimbal spring 4.

What is claimed is:

1. A structure for fixing a floating type magnetic head to a gimbal spring comprising:

a magnetic core having a gap therein and a coil wound therearound;

a slider having said magnetic core fixed thereto and having a floating force applied thereto by an air flow above a magnetic disk against which said slider is placed in moving contact; and a cantilever gimbal spring having a free end with a mounting surface on one side thereof to which a portion of said slider is fixed by an adhesive layer such that a spring force is applied to said slider opposing said floating force;

wherein said free end of said gimbal spring has holes formed therethrough communicating to a rear surface thereof, and said adhesive layer is applied not only between said mounting surface and said slider, but also into said holes and around onto said rear surface of said gimbal spring, whereby a stronger adhesive bond is provided between the gimbal spring and the slider by the increased adhesion area of said holes and said rear surface of said gimbal spring.

* * * * *